United States Patent [19]
Bakita et al.

[11] Patent Number: 5,448,730
[45] Date of Patent: Sep. 5, 1995

[54] CORRELATING A RESPONSE WITH A PREVIOUSLY SENT REQUEST IN A MULTITASKING COMPUTER SYSTEM USING PIPELINE COMMANDS

[75] Inventors: Thomas R. Bakita, Raleigh; Steven M. Crimmins, Durham; Thomas L. Howe, Oxford; Frederick J. Reznak, Cary, all of N.C.

[73] Assignee: International Business Machines Corporation, Armonk, N.Y.

[21] Appl. No.: 166,754

[22] Filed: Dec. 14, 1993

[51] Int. Cl.⁶ .................................. G06F 9/38
[52] U.S. Cl. ......................... 395/650; 395/375; 364/231.8; 364/262.4; 364/263; 364/263.1; 364/DIG. 1; 364/270.2
[58] Field of Search .............. 395/650, 375, 700; 364/231.8

[56] References Cited
U.S. PATENT DOCUMENTS
5,208,914  5/1993  Wilson et al. ............. 395/275
5,241,635  8/1993  Papadopoulos et al. ....... 395/375
5,282,272  1/1994  Guy et al. ................ 395/275

Primary Examiner—Kevin A. Kriess
Assistant Examiner—John Q. Chavis
Attorney, Agent, or Firm—Steven B. Phillips

[57] ABSTRACT

Method and apparatus for tagging a service request and the responses to a service request in a pipeline program running on a task in a multitasking computer system. Each service request made to a service supplier from a pipeline stage is tagged with a unique identifier string that is automatically returned to the pipeline with the response to the service request. A time manager stage monitors the unique identifiers appended to responses directed into the pipeline and uses the identifiers to correlate each response to a specific, previously sent request. The time manager then directs the responses to the appropriate destination stage. The time manager also discards responses that are no longer needed either because the appropriate destination stage or pipeline is no longer active, or because a user specified time-out interval has elapsed.

10 Claims, 4 Drawing Sheets

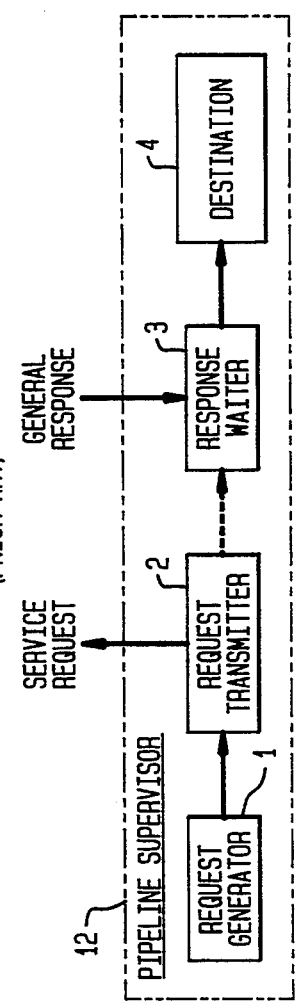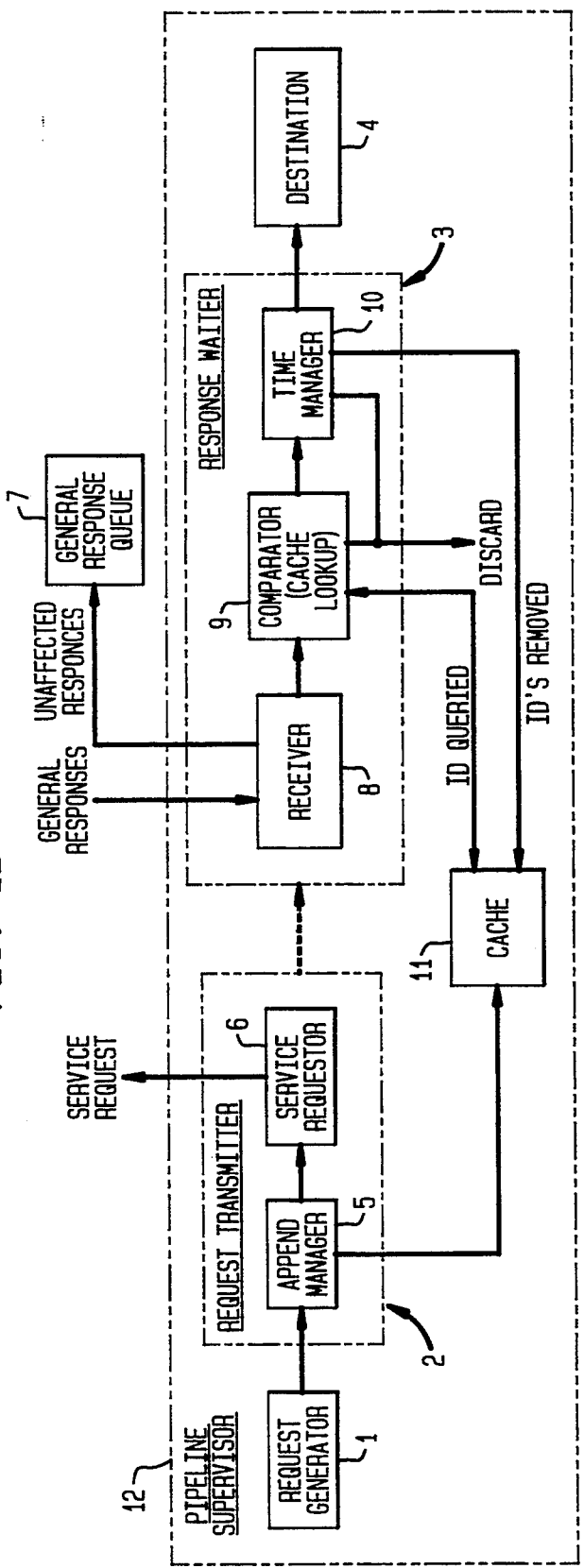

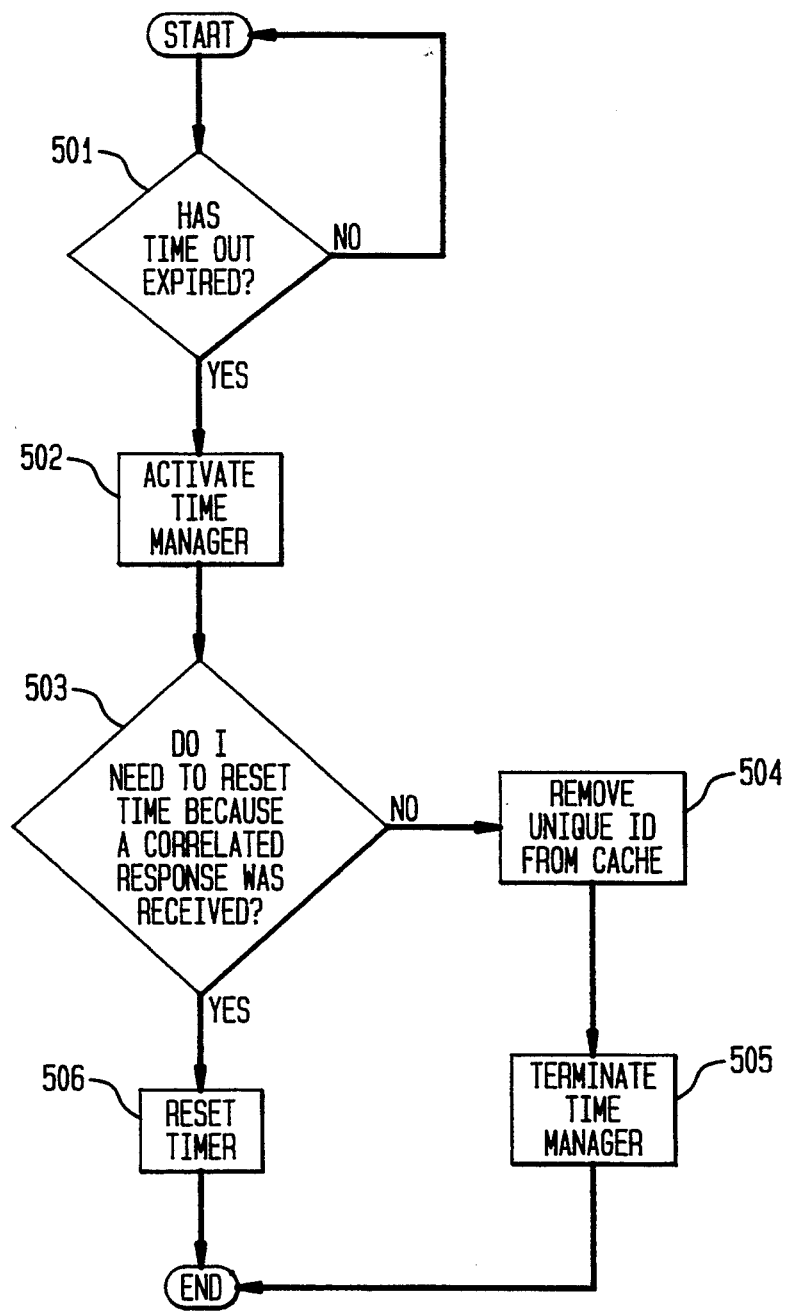

CORRELATING A RESPONSE WITH A PREVIOUSLY SENT REQUEST IN A MULTITASKING COMPUTER SYSTEM USING PIPELINE COMMANDS

BACKGROUND

1. Field of the Invention

This invention relates to multitasking computer programming techniques, specifically, to "pipeline" programming. Pipeline programming environments are well known in the art. A pipeline is a series of several independent programs called "stages." The output data from one stage flows into the input of the next stage. A pipeline is like an assembly line in which the work pieces are data, and at each stage, some operation is performed on the data.

2. Prior Art

Pipelines are usually used in multitasking environments. Using pipelines in such an environment saves time and computing resources. In most operating environments where pipelines are available, a pipeline is created within a task and put into operation with a single command in which the various stages to be combined in series are specified as parameters of that command. For example, in the CMS operating system, a pipeline is created with the "pipe" command, and the stages are specified as parameters separated by vertical bars. A simple CMS pipe command might be:

```
pipe <text file   count words   console
```

The command "pipe" invokes a pipeline supervisor, a program that manages the flow of data through the various stages of the pipeline. The first stage is specified by < and reads the contents of a file called "text file". The second stage is specified by the parameter "count words" and counts the words in that file, and the third and last stage is called "console" and displays the output from the preceding stage (the word count) on the computer console. Complete details on how to use CMS pipelines can be found in the publication, *Virtual Machine/Enterprise Systems Architecture CMS Pipelines User's Guide*, Release 1.1, IBM Publication Number SC24-5609-00, 1992, which is incorporated herein by reference.

Problems can arise with pipelines when one stage in a pipeline sends a service request to a program, system, or device outside of the pipeline, and the response to the service request is to be received by a subsequent stage in the pipeline. The service request could be directed simply to another program running in the same processor and memory but outside the address space of the task running the current pipe command. Or, the service request could be directed to another computer system or to a peripheral such as a printer or a disk drive. In any case, the service supplier will send back responses asynchronously, that is independently of what the pipeline is still doing or whether the pipeline even still exists.

FIG. 1A shows a conceptual block diagram of the stages involved in the above service request process. The names chosen for the various stages are generic. The "pipeline supervisor" 12 controls the overall flow of information in the pipeline. The stage generating the request is called the "request generator" 1. It sends the request to the next stage, the "request transmitter" 2, which is a program to access whatever transmission path is needed to send the request to the appropriate place. A subsequent stage in the pipeline is called the "response waiter" 3 because it waits for a response to the service request, and then passes it on to the appropriate subsequent stage, the "destination" 4.

The response waiter pipeline stage receives all general responses arriving at the task on which the pipeline is running. Since many pipelines are being invoked, run, and terminated constantly on a given task, there is a constant flow of responses arriving from various service suppliers. The response waiter must understand all of the possible responses for a given service request. Some responses will have been delayed and will be to service requests from pipelines that no longer exist. In addition, unsolicited responses that are not related to the current pipeline's service request arrive constantly at the task. To account for these problems, the user must add stages to an individual pipeline to filter out unwanted, duplicative or late responses. It may not be possible to distinguish a late response from the desired response. In either case, extra time and processing power is used by the response waiter and any necessary filtering stages in analyzing and possibly discarding responses.

What is needed is a method to uniquely tag each service request in a way so that a response to a service request will be sent back to the pipeline bearing the tag. Additionally, a timing mechanism needs to be provided so that responses which are delayed so long that they can no longer be used can be identified and discarded. Such a response is called a "stale" response.

SUMMARY

The present invention fulfills the above needs by providing improvements to the stages which is called the "request transmitter" and the "response waiter." The request generator and the destination are unchanged. A storage means, such as a cache or a block of memory which can be accessed by both the response waiter and the request transmitter has been added. In the preferred embodiment the storage means is called a "cache."

According to the invention, every service request passes through a substage within the request transmitter called the "append manager." The append manager appends a unique identifier to the service request and records that identifier in the cache before the request is transmitted to a service supplier. The unique identifier is simply a string of characters which is used for one and only one service request. The unique identifier is appended to the service request in such a way that it will be returned with any response to the request that the service supplier sends back to the pipeline.

The invention also includes an improved response waiter stage. The improved response waiter includes a substage to provide cache look-up when a response with a unique ID is received. Additionally, a substage called the "time manager" is provided which removes the unique ID from the cache when a destination stage is no longer available to receive responses, or when a user specified time period has elapsed. When a tagged or "correlated" response is received, the cache is checked for the presence of the unique ID. When the unique ID is located in the cache, the response is forwarded to the appropriate destination stage in the pipeline. If the unique ID is not present in the cache, it can be safely assumed that the response is stale or that the destination stage is no longer available, and the response is discarded.

It should be noted that a significant advantage of the present invention is that responses that are no longer needed or wanted are discarded before being sent into the pipeline. Computer resources and processing time are thus saved. Also, the burden of accounting for late responses in the pipeline command and in the program is removed from the user.

BRIEF DESCRIPTION OF THE DRAWINGS

FIG. 1A is a block diagram of the request/response portion of a pipeline in the prior art.

FIG. 1B is a block diagram of the same request/response portion of a pipeline in which the present invention is employed.

FIG. 5 is a flowchart of the method by which the time manager is permanently deactivated when the user-specified time-out interval expires.

DETAILED DESCRIPTION OF THE PREFERRED EMBODIMENT

Figure 2:
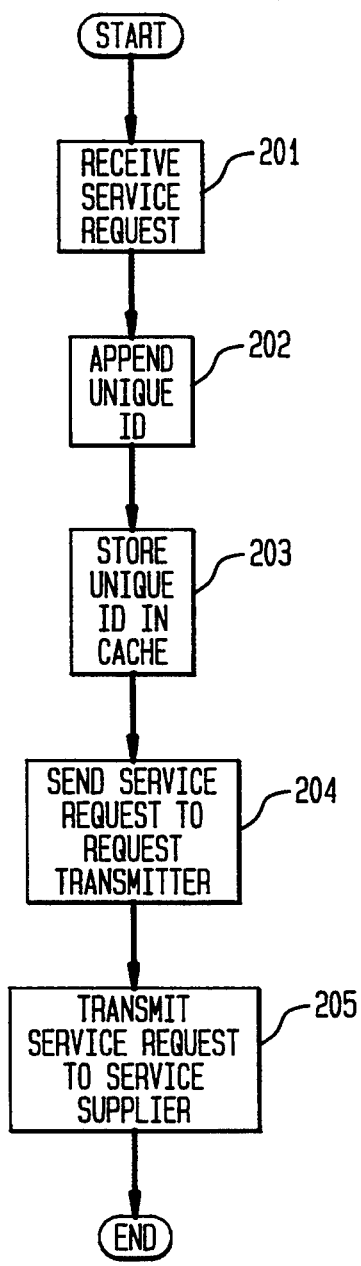
FIG. 2 is a flowchart of the method by which correlated service requests are created in the request transmitter according to the invention.

A block diagram of the request/response portion of a pipeline employing the invention is shown in FIG. 1B. According to the invention, a service request passes through a substage within the improved request transmitter which is called the "append manager" 5, before being transmitted to a service supplier. The append manager appends a unique identifying string (unique ID) to the service request, and records that string in a cache 11. The now tagged request is passed on to a "service requester" 6, which accesses the appropriate transmission path and transmits the request to the service supplier. The unique ID is appended in such a way that all responses to a tagged request from a service supplier will also have the unique ID appended.

The invention also includes improvements to the response waiter stage wherein it now includes three substages. The "receiver" 8, captures responses from service suppliers and examines them to determine if they have been tagged with a unique ID employed by the invention. If not, the receiver passes them on to a general response queue 7, where they are eventually forwarded on to their destinations in the manner of the prior art. If a response has a unique ID tag, it is forwarded by the receiver to the "comparator."

The "comparator" 9, performs a cache look-up to determine if a destination in a pipeline is waiting for responses with that tag. If the unique ID is not present in the cache, the comparator assumes that the ID has been removed because the destination is no longer available to receive responses with that unique ID, as will be described later, and the response is discarded. If the unique ID is present in the cache, the comparator forwards the response on to the appropriate "time manager" substage. For simplicity, only one time manager is shown in the drawing. In reality, a time manager substage will be created for each destination for correlated responses.

The "time manager" 10, has two functions. It monitors the receipt of responses with the relevant unique ID during the passage of a user-specified time-out interval and records where in that interval a tagged response (correlated response) for the associated pipeline destination stage is received. It also removes the unique ID tag from the cache when the associated destination is no longer available to receive responses from the service supplier, or when the time-out interval has elapsed. When the time-out interval elapses with no correlated responses having been received, the destination stage associated with the time manager is said to have "timed out." The time manager actually remains dormant until its destination times out, a correlated response is received, or the time manager is notified by the pipeline supervisor that its pipeline destination is no longer available to receive responses.

When a correlated response is received, the time manager is activated. It checks to see if the destination stage is still available to receive responses. If it is, the time manager makes a time record of when the response was received and forwards the response to the destination. If the destination has gone inactive or is otherwise no longer available, the time manager permanently deactivates itself by first removing the unique ID from the cache then discarding the correlated response. After discarding the correlated response, the time manager ceases execution and removes itself from memory. When the time manager removes itself from memory it is said to have "terminated" itself.

The time manager also keeps track of a user specified time-out interval for its associated destination, to prevent stale responses from having to be processed by the destination pipeline. In order to make use of the present invention, the user specifies a "correlated wait stage" as one of the stages of the pipeline being created. The improved request transmitter and response waiter will then be set up as part of the pipeline. At this time, the user also enters the amount of time desired for a time-out interval as an additional parameter. In the preferred embodiment, the correlated wait stage is specified by the term "corrwait" and the time-out is specified in seconds. Thus, if the user entered "corrwait 5" as one of the stages in a PIPE command, the time-out interval would be set to five seconds, as in the following example:

pipe MVS D T    corrwait 5    stem times.

As before the command "pipe" invokes the pipeline supervisor 12 of FIG. 1B. The first stage of the pipeline "MVS D T" sends a service request to MVS for the current date and time. The correlated wait stage according to this invention is specified by "corrwait 5" with a time-out interval of five seconds. The stage specified by "stem times" stores the response in a variable array called "times."

When the time-out interval for a particular time manager elapses, the time manager is activated. The time manager then checks to see if a correlated response was received since the beginning of the time-out interval. If a correlated response was received, the time interval is re-started and the time manager goes dormant again. If not, the destination stage is considered to be timed out. The time manager then removes the associated unique ID from the cache and terminates itself.

The time manager can also be "forced" active by the pipeline supervisor and notified that a destination is no longer available. In this case it removes the appropriate unique ID from the cache, and terminates itself in the same way as when it discovers a destination is no longer present upon being activated by receiving a correlated response.

The method by which a correlated service request is created is shown in FIG. 2. This method is executed in the request transmitter of FIG. 1B. Referring to FIG. 2, the request transmitter first receives a service request from the request generator at 201. A unique identifier string (unique ID) is appended to the service request at 202. The unique ID could be generated at random. However, in the preferred embodiment, the system clock value at the time the request command is transmitted is used as the unique ID. The system clock value, since it advances continuously, will be different for each request. Thus, the uniqueness of each ID generated is more certain than if a random number is used, as there is some small probability that a random number will be repeated.

The program that implements the correlated wait stage of the pipeline must be designed to append the request in such a way so that the known service suppliers will automatically send their responses back to the pipeline with the unique ID intact and appended to the responses. One skilled in the art will be familiar with the operation of the various known service suppliers and can easily do this. Details on how a command can be sent to a service supplier with a tag that will automatically be returned with the response can be found in the appropriate documentation for the specific service supplier in question. For example, in the preferred embodiment, an important service supplier is the IBM MVS operating system, in which the command and response token (CART) is used as the unique ID. The CART is an eight-byte field which can optionally be included in request commands sent to MVS, and if included in a command will be returned unchanged with the responses to the command. Therefore, in the preferred embodiment of the invention operating with MVS as a service supplier, the CART is set to the system clock value (an eight-byte value) when the request command is transmitted to MVS. The response to the command is then returned from MVS with a CART, the value of which equals the system clock value at the time the original command was sent. Complete details on the IBM MVS operating system, including the CART can be found in the *MVS/ESA Application Development Reference*, Fourth Edition, IBM Publication Number GC28-1649, 1991, which is incorporated herein by reference.

Returning to FIG. 2, once the unique ID is appended to the service request, it is stored in a block of memory dedicated to storing unique ID's (a "cache"). This storage step is shown at 203 and is performed by the append manager 5 of FIG. 1B. The service request is then sent to the request transmitter 2 at 204, which transmits the request to a service supplier such as MVS at 205.

Figure 3:
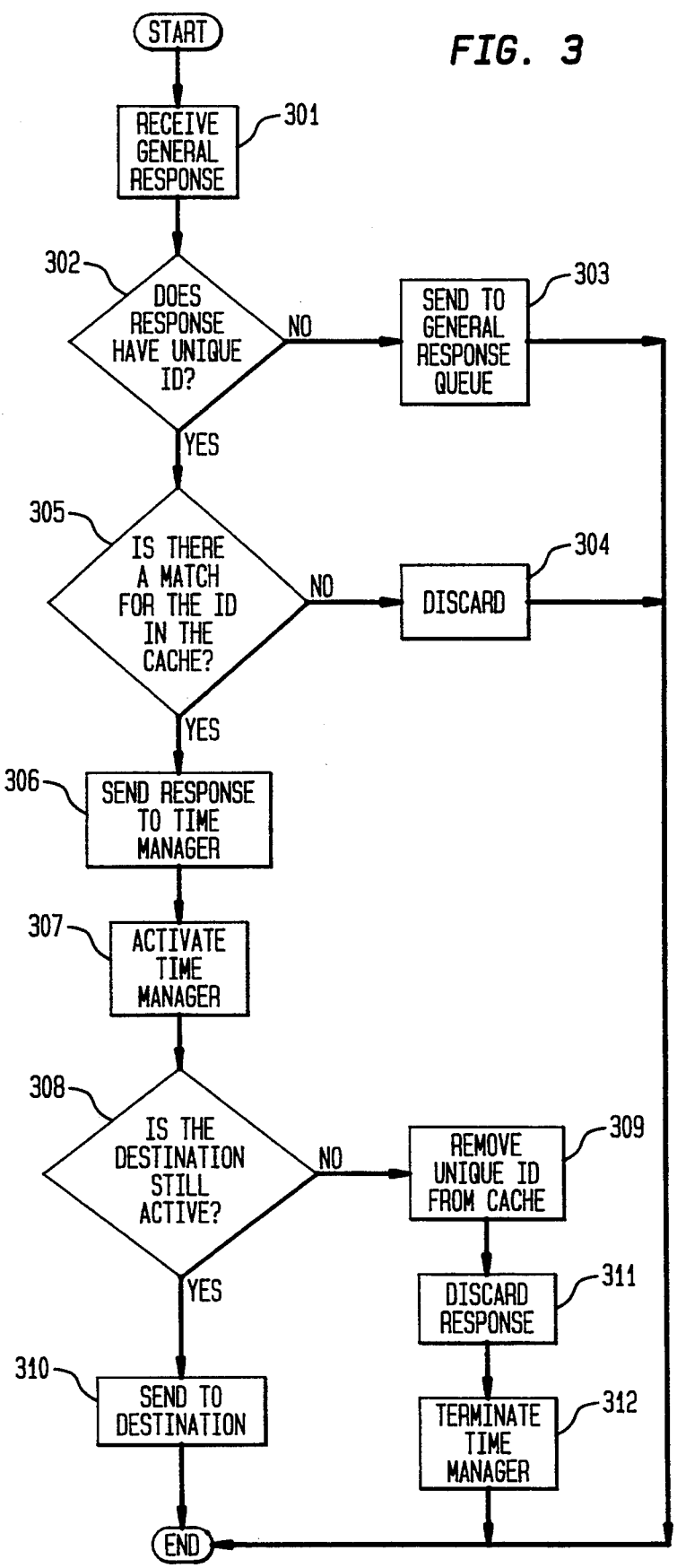
FIG. 3 is a flowchart of the method by which responses from service suppliers are processed by the response waiter according to the invention.

FIG. 3 is a flowchart showing the method by which the response waiter 3 of FIG. 1B processes responses. All responses, regardless of whether they have a unique ID according to this invention, are processed at 301 by the receiver 8 of FIG. 1B and are designated as general responses. At 302, a determination is made as to whether the response has a unique ID according to this invention. If it does not, it is sent to a general response queue 7 and processed in the manner of the prior art at 303. If it does, the cache 11 is checked at 305 to determine if the specific unique ID is stored in the cache. The cache look-up is performed by the comparator 9 of FIG. 1B. If the unique ID is not present in the cache, it is assumed that the response is no longer needed or wanted, and the response is discarded at 304. If the unique ID is present, the response is sent at 306 to the time manager 10 for the appropriate destination stage, and the time manager 10 becomes active and takes over the process at 307 of FIG. 3.

The time manager 10 checks at 308 to see if the destination for the response is active; that is, if the destination is available in the system. If the destination is available, the time manager 10 sends the response on to the appropriate destination stage in the pipeline at 310. Note that in this case, the unique ID is left in the cache 11, as a single service request with a unique ID could in some cases produce more than one discrete response.

If the time manager 10 finds that its destination for correlated responses with the relevant unique ID is no longer active, it will remove the unique ID from the cache 11 at 309, discard the response at 311, and terminate itself at 312. For future responses received with that unique ID, it will now be determined early on in the process at 305 that the responses are no longer wanted, and they will be discarded, saving computing time and resources.

Figure 4:
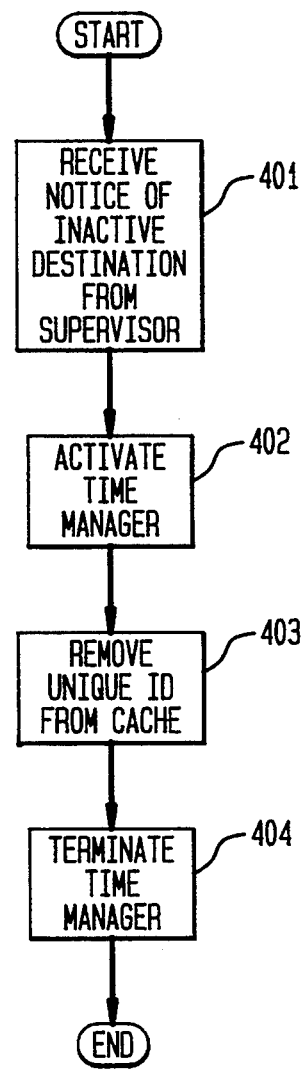
FIG. 4 is a flowchart of the method by which the time manager substage of the present invention is deactivated by the pipeline supervisor because a destination for correlated responses is no longer available.

FIG. 4 shows how a time manager 10 is activated and terminated when it receives a notice that its destination is no longer active. In the preferred embodiment this notice comes from the pipeline supervisor 12, but a system could be designed in which the notice is sent by the destination stage itself when the destination stage becomes inactive.

The pipeline supervisor 12 in FIGS. 1A and 1B is the controlling program for a pipeline. It determines the processing steps of the pipeline and how the stages interact. The pipeline supervisor monitors the flow of information between stages and can detect when a destination stage becomes inactive. In the present invention, when the pipeline supervisor detects that a destination stage has become inactive, it notifies the time manager 10. The time manager 10 is automatically activated when it receives a notice from the pipeline supervisor 12.

Returning to FIG. 4, the notice from the pipeline supervisor is received at 401, and the time manager 10 is activated at 402. The time manager 10 removes the appropriate unique ID associated with its destination from the cache 11 at 403, and terminates itself at 404.

FIG. 5 shows the method by which the time manager substage monitors the passage of the time-out interval. When the time manager is created, the pipeline supervisor is set to activate the time manager each time the time-out interval elapses. The pipeline supervisor determines when the specified time-out interval has elapsed at 501. When the interval has passed, the pipeline supervisor activates the time manager 10 at 502. At 503 of FIG. 5, the time manager 10 checks to see if any responses with the appropriate unique ID (correlated responses) were received for its destination during the preceding user-specified time interval. If not, the pipeline destination stage is said to have "timed out" and the unique ID is removed from the cache 11 at 504. The time manager then terminates itself at 505. If a correlated response with the unique ID for its destination was received during the preceding time interval, the time manager 10 restarts the running of the time interval at 506 and goes inactive to wait for the next event. The next event can be the passage of the time interval again, the deactivation of the destination stage, or the receipt of another correlated response, whichever comes first.

In the preferred embodiment of the invention, the time manager 10 is activated whenever a correlated response for its destination is received, and the time manager 10 records the receipt of the response. Thus, the time manager 10 has a record of the past receipt of a correlated response when it is activated to determine if the destination stage has become inactive or has timed out. This method is preferred to an alternate method in which the running of the time-out interval is restarted each time a correlated response is received, because the preferred method uses less processing steps and so is more efficient.

Once a given destination for correlated responses to a command has timed out, the unique ID associated with that command is removed from the cache 11. Any future responses with that unique ID are considered stale and are discarded at 304 of FIG. 3, thus saving processing time and enabling the entire system to run faster and more efficiently than a system in which the invention is not employed.

While we have described a specific embodiment of our invention, one skilled in the art could use the method of our invention in a variety of systems and multitasking environments. All that is required is an understanding of how pipelines are invoked at the task level in the system of interest, and an understanding of the specifications for the service supplier or service suppliers with which the invention is to be employed.

We claim:

1. In a computer system, an apparatus for correlating a response from a service supplier with a previously sent service request, the apparatus comprising:

means for generating a unique identifier to be used to correlate the service request with the response from the service supplier;

means for appending the unique identifier to the service request;

means for storing the unique identifier;

means for sending the service request to the service supplier;

means for receiving the response with the unique identifier from the service supplier, the response directed to a specific destination within the computer system;

means for examining the storage means to determine if the unique identifier is present in the storage means;

means for determining when the response containing the unique identifier received from the service supplier for the specific destination has been received within a user-specified time interval, the user-specified time interval being monitored by a time manager;

means for determining if the specific destination for the response is active within the system; and means for sending the response to the destination if the destination is active and if the response containing the unique identifier for the specific destination has been received within the user-specified time interval.

2. In a computer system, a computer implemented method for processing a correlated response to a service request, the method comprising the steps of:

receiving a response from a service supplier, the response directed to a specific destination within the computer system;

examining the response to determine if a unique identifier correlated to a previously sent service request is present;

examining, if the unique identifier correlated to a previously sent service request is present in the response, a storage means to determine if the unique identifier is present in the storage means;

activating a time manager associated with the specific destination of the response;

sending, if the unique identifier is present in the storage means, the response to the time manager associated with the specific destination of the response;

determining if the response containing the unique identifier for the specific destination has been received within a user-specified time interval, the user-specified time interval being monitored by the time manager; and sending the response to the destination if the destination is active and if the response containing the unique identifier for the specific destination has been received within the user-specified time interval.

3. The method of claim 2 further comprising the step of:

sending the response to a general response queue when no unique identifier is present in the response.

4. The method of claim 2 further comprising the step of:

discarding the response when the response includes a unique identifier that is not present in the storage means.

5. The method of claim 2 further comprising the steps of:

removing the unique identifier from the storage means when the destination is no longer active; and terminating the time manager.

6. In a computer system, a computer implemented method for permanently deactivating a dormant time manager for responses from service suppliers, the time manager associated with a specific destination and each response containing a unique identifier, the method comprising the steps of:

sending a notification from a pipeline supervisor that the specific destination is no longer active so that unique identifiers associated with that specific destination can be removed from a storage means in order to save computer system resources;

receiving the notification from the pipeline supervisor that the specific destination for responses containing the unique identifier is no longer available to receive responses;

removing from the storage means unique identifiers associated with responses for the specific destination; and terminating the time manager associated with the specific destination in order to save computer system resources.

7. In a computer system, a computer implemented method for permanently deactivating a dormant time manager associated with a specific destination for responses from service suppliers, each response containing a unique identifier, the method comprising the steps of:

determining if a user-specified time interval associated with the time manager for the specific destination for responses with a unique identifier from service suppliers has elapsed;

activating the time manager for the specific destination only if the user specified time interval has elapsed;

determining if the time interval should be restarted because a response with a unique identifier for the specific destination associated with the time manager was received within the user-specified time interval;

removing a unique identifier associated with the response for the specific destination from a storage means only if the time interval is not restarted; and terminating the time manager in order to save computer system resources.

8. In a computer system, an apparatus for correlating a response received from a service supplier with a service request generated by a service request generator, the apparatus comprising:

means for generating a unique identifier to be appended to the service request;

means for appending the unique identifier to the service request;

storage means for storing the unique identifier;

means for determining if a response contains the unique identifier;

means for determining if the response containing the unique identifier received from the service supplier for a specific destination has been received within a user-specified time interval, the user-specified time interval being monitored by a time manager; and means for determining if the unique identifier is present in the storage means if the response contains the unique identifier and if the response was received within the user-specified time interval.

9. In a computer system, apparatus for determining when a response containing a unique identifier from a service supplier for a specific destination has been received within a user-specified time interval, the apparatus comprising:

timer means for determining that the user-specified time interval has elapsed;

means for determining if the response was received within the user-specified time interval;

means for resetting the timer means if the response was received; and means for removing a unique identifier from a storage means if the timer is not reset.

10. The apparatus of claim 9, further comprising:

means for determining if the specific destination for the response from the service supplier is active within the computer system; and means for removing the unique identifier from the storage means if the specific destination is not active within the computer system.

* * * * *